United States Patent
Yamada et al.

(10) Patent No.: US 8,954,110 B2
(45) Date of Patent: Feb. 10, 2015

(54) COMMUNICATION DEVICE, COMMUNICATION SYSTEM AND PROGRAM

(75) Inventors: Kazuhiro Yamada, Yokohama (JP); Eiju Yamada, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 1065 days.

(21) Appl. No.: 12/670,503

(22) PCT Filed: Jul. 25, 2008

(86) PCT No.: PCT/JP2008/063363
§ 371 (c)(1),
(2), (4) Date: Jun. 4, 2010

(87) PCT Pub. No.: WO2009/017040
PCT Pub. Date: Feb. 5, 2009

(65) Prior Publication Data
US 2010/0240394 A1    Sep. 23, 2010

(30) Foreign Application Priority Data
Jul. 27, 2007   (JP) ................................. 2007-195767

(51) Int. Cl.
*H04M 1/00*   (2006.01)
*H04W 24/00*   (2009.01)
*H04W 4/02*   (2009.01)
(Continued)

(52) U.S. Cl.
CPC ........ *H04W 4/025* (2013.01); *H04M 1/274516* (2013.01); *H04M 1/274583* (2013.01); *H04M 1/72572* (2013.01); *H04M 1/274508* (2013.01)
USPC .................. 455/550.1; 455/456.1; 455/456.2; 455/456.3; 455/456.4; 455/456.5; 455/456.6; 455/457

(58) Field of Classification Search
USPC .......................... 455/456.1–456.6, 457, 550.1
See application file for complete search history.

(56) References Cited

U.S. PATENT DOCUMENTS

2001/0019517 A1*   9/2001   Ogasawara ..................... 368/37
2002/0016164 A1*   2/2002   Mead et al. .................... 455/414
(Continued)

FOREIGN PATENT DOCUMENTS

JP   11055389   2/1999
JP   11088495   3/1999
(Continued)

OTHER PUBLICATIONS

PCT International Search Report; International Application No. PCT/JP2008/063363.
(Continued)

*Primary Examiner* — Ajit Patel
*Assistant Examiner* — Matthew Genack
(74) *Attorney, Agent, or Firm* — MKG LLC

(57) ABSTRACT

To improve convenience of a function of rearranging and conveying information registered in an address book. A mobile phone, if any one of users registered in an address book is selected, obtains location information of a mobile phone owned by the selected user from a location search server. The mobile phone, by comparing location information of a home or an office of the selected user registered in the address book and the location information of the mobile phone obtained from the location search server, decides an indication sequence of plural communication addresses registered in the address book for the selected user.

8 Claims, 13 Drawing Sheets

(51) Int. Cl.
*H04M 1/2745* (2006.01)
*H04M 1/725* (2006.01)

(56) References Cited

U.S. PATENT DOCUMENTS

| | | | |
|---|---|---|---|
| 2004/0056901 A1 | 3/2004 | March et al. | |
| 2006/0104428 A1* | 5/2006 | Jin | 379/142.01 |
| 2006/0276962 A1* | 12/2006 | Yoshioka et al. | 701/208 |
| 2007/0037561 A1* | 2/2007 | Bowen et al. | 455/418 |
| 2007/0041555 A1* | 2/2007 | Marwell et al. | 379/218.01 |
| 2007/0129063 A1 | 6/2007 | Recio et al. | |
| 2007/0293238 A1* | 12/2007 | Fiatal et al. | 455/456.1 |
| 2008/0072294 A1* | 3/2008 | Chatterjee | 726/4 |
| 2008/0079581 A1* | 4/2008 | Price | 340/572.1 |
| 2008/0177797 A1 | 7/2008 | Eldering et al. | |

FOREIGN PATENT DOCUMENTS

| | | |
|---|---|---|
| JP | 2000165501 A | 6/2000 |
| JP | 2002300263 | 10/2002 |
| JP | 2003224681 | 8/2003 |
| JP | 2003281068 | 10/2003 |
| JP | 2004040427 | 2/2004 |
| JP | 2005130187 A | 5/2005 |
| JP | 2006262332 | 9/2006 |
| WO | 2007008761 A1 | 1/2007 |
| WO | 2007063499 A1 | 6/2007 |

OTHER PUBLICATIONS

Japanese Notification of Reasons for Refusal; Japanese Patent Application No. 2010-180939; Date Mailed Oct. 18, 2011.
European Search Report for EP Application No. 08791607.8-2414/2175623 dated Mar. 26, 2012.
Japanese Office Action issued against JP Patent Application No. 2010-180939 dated Feb. 21, 2012.
Extended European Search Report issued in corresponding European Application No. 12180649.1 dated Oct. 5, 2012.
Office Action issued in corresponding Chinese Application No. 201210327386.8, dated Jul. 3, 2014.
Non-Final Office Action issued in U.S. Appl. No. 14/025,294, dated Oct. 9, 2014, pp. 1-10.

* cited by examiner

FIG. 3

16a: ADDRESS BOOK

| USER NAME | MOBILE PHONE | | HOME | | | OFFICE | | |
|---|---|---|---|---|---|---|---|---|
| | TELEPHONE NUMBER | MAIL ADDRESS | TELEPHONE NUMBER | MAIL ADDRESS | ADDRESS | TELEPHONE NUMBER | MAIL ADDRESS | ADDRESS |
| TARO YAMADA | 090-1111-1111 | Tarou@aaa.co.jp | 03-2222-2222 | YamaTarou@bbb.co.jp | 13-1, SHIMOMARUKO 2-CHOME, OHTA-KU, TOKYO | 03-3333-3333 | Tarou_Yamada@ccc.co.jp | 11-1, NAGATA-CHO 2-CHOME, CHIYODA-KU, TOKYO |
| HANAKO SUZUKI | 090-4444-4444 | Hanako@ddd.co.jp | 03-5555-5555 | Suzu_Hana@eee.co.jp | 1-8, EBARA 5-CHOME, SHINAGAWA-KU, TOKYO | 03-6666-6666 | Hanako_Suzuki@fff.co.jp | 2-10, NIHOMBASHI 1-CHOME, CHUO-KU, TOKYO |
| ... | ... | ... | ... | ... | ... | ... | ... | ... |

TARO YAMADA

SIX COMMUNICATION ADDRESSES ARE REGISTERED
SELECT COMMUNICATION ADDRESS FOR USE

①03-3333-3333 (OFFICE TELEPHONE)

②Tarou_Yamada@ccc.co.jp (OFFICE MAIL)

③090-1111-1111 (MOBILE PHONE)

④Tarou@aaa.co.jp (MOBILE MAIL)

⑤03-2222-2222 (HOME TELEPHONE)

⑥YamaTarou@bbb.co.jp (HOME MAIL)

(b)

TARO YAMADA

SIX COMMUNICATION ADDRESSES ARE REGISTERED
SELECT COMMUNICATION ADDRESS FOR USE

①03-3333-3333 (OFFICE TELEPHONE)

②Tarou_Yamada@ccc.co.jp (OFFICE MAIL)

③090-1111-1111 (MOBILE PHONE)

④Tarou@aaa.co.jp (MOBILE MAIL)

⑤YamaTarou@bbb.co.jp (HOME MAIL)

⑥03-2222-2222 (HOME TELEPHONE)

TARO YAMADA

SIX COMMUNICATION ADDRESSES ARE REGISTERED
SELECT COMMUNICATION ADDRESS FOR USE

①090-1111-1111　　　　　(MOBILE PHONE)

②Tarou@aaa.co.jp　　　　(MOBILE MAIL)

③YamaTarou@bbb.co.jp　　(HOME MAIL)

④Tarou_Yamada@ccc.co.jp　(OFFICE MAIL)

⑤03-2222-2222　　　　　(HOME TELEPHONE)

⑥03-3333-3333　　(OFFICE TELEPHONE)

(b)

TARO YAMADA

SIX COMMUNICATION ADDRESSES ARE REGISTERED
SELECT COMMUNICATION ADDRESS FOR USE

①090-1111-1111　　　　　(MOBILE PHONE)

②Tarou@aaa.co.jp　　　　(MOBILE MAIL)

③Tarou_Yamada@ccc.co.jp　(OFFICE MAIL)

④YamaTarou@bbb.co.jp　　(HOME MAIL)

⑤03-3333-3333　　(OFFICE TELEPHONE)

⑥03-2222-2222　　(HOME TELEPHONE)

TARO YAMADA

SIX COMMUNICATION ADDRESSES ARE REGISTERED
SELECT COMMUNICATION ADDRESS FOR USE

| ①YamaTarou@bbb.co.jp | (HOME MAIL) |
| ②03-2222-2222 | (HOME TELEPHONE) |
| ③Tarou@aaa.co.jp | (MOBILE MAIL) |
| ④090-1111-1111 | (MOBILE PHONE) |
| ⑤Tarou_Yamada@ccc.co.jp | (OFFICE MAIL) |
| ⑥03-3333-3333 | (OFFICE TELEPHONE) |

(b)

TARO YAMADA

SIX COMMUNICATION ADDRESSES ARE REGISTERED
SELECT COMMUNICATION ADDRESS FOR USE

| ①YamaTarou@bbb.co.jp | (HOME MAIL) |
| ②Tarou@aaa.co.jp | (MOBILE MAIL) |
| ③Tarou_Yamada@ccc.co.jp | (OFFICE MAIL) |
| ④03-2222-2222 | (HOME TELEPHONE) |
| ⑤090-1111-1111 | (MOBILE PHONE) |
| ⑥03-3333-3333 | (OFFICE TELEPHONE) |

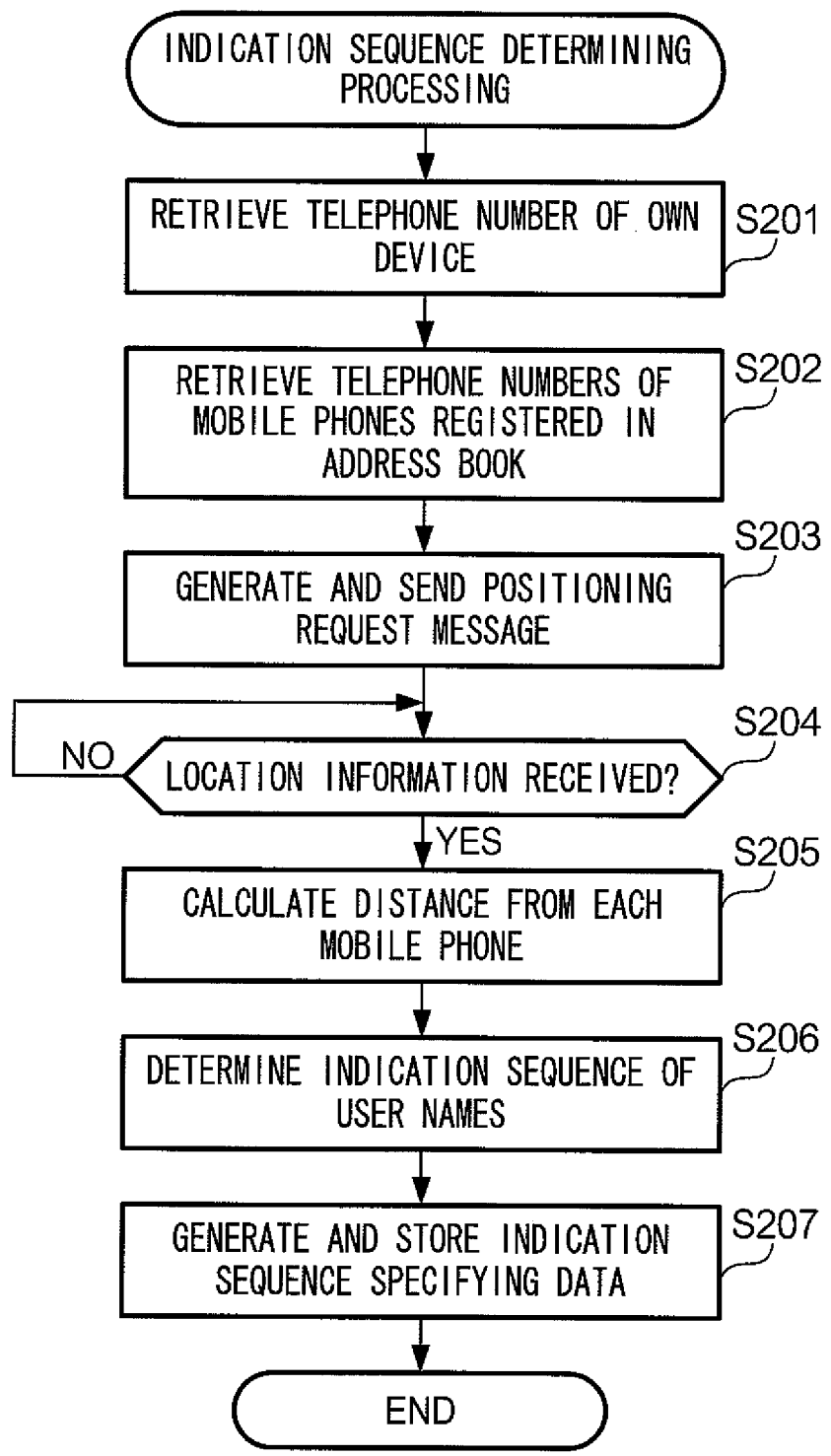

LIST OF USER NAMES

FOUR ENTRIES ARE REGISTERED IN ADDRESS BOOK
SELECT PERSON TO COMMUNICATE

| JIRO SATO |
|---|

| TARO YAMADA |
|---|

| MOTHER |
|---|

| HANAKO SUZUKI |
|---|

(b)

LIST OF USER NAMES

FOUR ENTRIES ARE REGISTERED IN ADDRESS BOOK
SELECT PERSON TO COMMUNICATE

| USER NAME | DISTANCE |
|---|---|
| JIRO SATO | 0.8Km |
| TARO YAMADA | 5.2Km |
| MOTHER | 7.1Km |
| HANAKO SUZUKI | 15.7Km |

COMMUNICATION DEVICE, COMMUNICATION SYSTEM AND PROGRAM

FIELD OF THE INVENTION

The present invention relates to a technique of rearranging information registered in an address book and conveying the information.

BACKGROUND ART

Prior art discloses a mobile phone unit with phone book data capable of registering three telephone numbers (a telephone number for business, a private telephone number, and a telephone number of a mobile phone) for communication with one person, whereby, if a current date and time is 10 a.m. on Monday, rearranges and displays the telephone numbers in an order of "for business," "mobile phone," and "private," and if a current date and time is a weekend, rearranges and displays the telephone numbers in an order of "private," "mobile phone," and "for business." It has also been disclosed that changing an indication sequence of telephone numbers or mail addresses registered in an address book according to a period of time or a day of the week.

At the present, if a current date and time is 10 a.m. on Monday (business hours), displaying telephone numbers of a person to communicate in an order of "for business," "mobile phone," and "private," and in this case, if the person is in an office, there is no problem. However, if the person is out of an office, for example, on a business trip, it is better to make a phone call, instead of using the telephone number "for business" whose indication sequence level is first, using the telephone number of a "mobile phone" whose indication sequence level is second. Also, if the person takes time off from work and stays home, it is better to make a phone call using the "private" telephone number whose indication sequence level is third. Similarly, it has also been disclosed that if a current date and time is a weekend (holiday), displaying telephone numbers of a person to communicate in an order of "private," "mobile phone," and "for business"; however, if the person is working on a holiday, it is better to make a phone call, instead of using the "private" telephone number whose indication sequence level is first, using the telephone number "for business" whose indication sequence level is third. Also, if the person is away from home, it is better to make a phone call using the telephone number of a "mobile phone" whose indication sequence level is second. As described in the foregoing, there may be a situation in which, when trying to communicate with a person, even if a user selects a telephone number whose indication sequence level is first, and makes a phone call using it, s/he cannot successfully communicate with the person, and s/he have to again browse phone book data to find a telephone number whose indication sequence level is second or lower, and again to make a phone call.

SUMMARY

The present invention has been made in view of the circumstances described above, and aims at improving convenience of a function of rearranging information registered in an address book and conveying the information.

In one aspect, the present invention provides a communication device comprising: a storage means for storing plural communication addresses for one user, one of the plural communication addresses being a communication address of a mobile device owned by the user, and one or more of the plural communication addresses other than the communication address of the mobile device, being associated with first location information at which the user communicates using the corresponding communication address; a mobile device location obtaining means for obtaining second location information indicating a location of the mobile device; a deciding means for deciding a notification sequence of the plural communication addresses stored in the storage means so that the notification sequence begins with, from the first location information stored in association with the communication addresses other than the communication address of the mobile device, first location information corresponding with the second location information obtained by the mobile device location obtaining means, or first location information indicating a location within a predetermined range from a location indicated by the second location information; and a notification control means for notifying the plural communication addresses in accordance with the notification sequence decided by the deciding means.

According to the present invention, a communication device is configured to decide a notification sequence of plural communication addresses stored in a storage means so that the notification sequence begins with, from first location information stored in association with communication addresses other than a communication address of a mobile device, first location information corresponding with second location information obtained by a mobile device location obtaining means, or first location information indicating a location within a predetermined range from a location indicated by the second location information. Accordingly, it is possible to consider a present location of the other person, and preferentially notify a communication address via which contact with the other person is likely to be made.

The deciding means may, if there is neither first location information corresponding with the second location information obtained by the mobile device location obtaining means, nor first location indicating a location within a predetermined range from a location indicated by the second location information, from the first location information stored in association with the communication addresses other than the communication address of the mobile device, decide a notification sequence beginning with the communication address of the mobile device.

Alternatively, the communication device may comprise: a time keeping means for keeping time; and a sequence correction means for correcting the notification sequence decided by the deciding means, on the basis of the time, and the notification control means may notify the plural communication addresses in accordance with the notification sequence corrected by the correction means.

Alternatively, the communication device may further comprise: a determining means for determining, on the basis of the location information obtained by the mobile device location obtaining means, whether a location indicated by the location information is in a foreign country; and a time difference correction means for, if it is determined by the determining means that the location is in a foreign country, obtaining a time difference from the location, and correcting the time kept by the time keeping means by an amount of the time difference, and the sequence correction means may correct the notification sequence on the basis of the time corrected by the time difference correction means.

Alternatively, the communication device may comprise: an own device location obtaining means for obtaining location information of the communication device; a time keeping means for keeping time; a time difference correction means for obtaining, on the basis of the location information obtained by the mobile device location obtaining means and the location information obtained by the own device location obtaining means, a time difference between a time at a location of the mobile device and a time at a location of the communication device, and correcting the time kept by the time keeping means by an amount of the time difference; and a sequence correction means for correcting the notification sequence decided by the deciding means, on the basis of the time corrected by the time difference correction means.

Alternatively, the communication device may further comprise: a selection means for selecting one of the plural communication addresses notified by the notification control means; and a communication means for communicating using the communication address selected by the selection means.

Alternatively, the communication device may further comprise a time keeping means for keeping time, and the mobile device location obtaining means may comprise: an accumulating means for obtaining location information of the mobile device at predetermined intervals, and accumulating the location information in a memory in association with time information indicating a time at which the location information was obtained; and a retrieving means for retrieving location information whose corresponding time information indicates a most recent time, from among the location information accumulated in the memory.

Alternatively, the communication device may further comprise a time keeping means for keeping time, and the mobile device location obtaining means further comprise: an accumulating means for obtaining location information of the mobile device at predetermined intervals, and accumulating the location information in a memory in association with time information indicating a time at which the location information was obtained; and an estimation means for estimating a current location of the mobile device, using a history of location information accumulated in the memory.

The present invention also provides a communication device comprising: a storage means for storing for each user to communicate, a user name and a communication address of a mobile device owned by the user; a mobile device location obtaining means for obtaining location information of each mobile device whose communication address is stored in the storage means; an own device location obtaining means for obtaining location information of the communication device; a calculation means for calculating a distance between the communication device and the mobile device on the basis of the location information obtained by the mobile device location obtaining means and the location information obtained by the own device location obtaining means; a deciding means for deciding a notification sequence of user names or communication addresses stored in the storage means so that the notification sequence begins with a name of a user owning a mobile device whose distance from the communication device, calculated by the calculation means, is shorter or a communication address of the mobile device whose distance from the communication device is shorter; and a notification control means for notifying the user names or the communication addresses in accordance with the notification sequence decided by the deciding means.

According to the present invention, a communication device obtains location information of mobile devices whose communication address is stored in a storage means and location information of the communication device, and calculates a distance between the communication device and each mobile device. Subsequently, the communication device decides a notification sequence of user names or communication addresses stored in the storage means, on the basis of the calculated distances. Accordingly, it is possible to consider a distance from the other person, and decide a notification sequence of user names or communication addresses stored in a storage means.

The deciding means may decide the notification sequence so that a notification sequence level of a user name or a communication address corresponding to a mobile device whose distance from the communication device is shorter is higher.

The notification control means may, in addition to notifying the user names or the communication addresses in accordance with the notification sequence decided by the deciding means, notify a distance of each mobile device from the communication device calculated by the calculation means.

The communication device may further comprise a selection means for selecting user names or communication addresses from the storage means, whose notification sequence level is to be decided.

The present invention also provides a communication system comprising a communication device and a management device for managing an address book for the communication device, wherein: the management device comprises: the address book for the communication deice for registering plural communication addresses for one user, one of the plural communication addresses being a communication address of a mobile device owned by the user, and one or more of the plural communication addresses other than the communication address of the mobile device, being associated with first location information at which the user communicates using the corresponding communication address; a mobile device location obtaining means for obtaining second location information indicating a location of the mobile device; a deciding means for deciding a notification sequence of the plural communication addresses registered in the storage means so that the notification sequence begins with, from the first location information registered in association with the communication addresses other than the communication address of the mobile device, first location information corresponding with the second location information obtained by the mobile device location obtaining means, or first location indicating a location within a predetermined range from a location indicated by the second location information; and a sending means for sending the address book and the notification sequence decided by the deciding means, to the communication device, and the communication device comprises: a receiving means for receiving the address book and the notification sequence; and a notification control means for notifying the plural communication addresses registered in the address book received by the receiving means, in accordance with the notification sequence received by the receiving means.

The present invention also provides a communication system comprising a communication device and a management device for managing an address book for the communication device, wherein: the management device comprises: the address book for registering for each user to communicate, a user name and a communication address of a mobile device owned by the user; an obtaining means for obtaining location information of each mobile device whose communication address is registered in the address book, and location information of the communication device; a calculation means for calculating a distance between the communication device and the mobile device on the basis of the location information obtained by obtaining means; a deciding means for deciding a notification sequence of user names or communication addresses registered in the address book so that the notification sequence begins with a name of a user owning a mobile device whose distance from the communication device, calculated by the calculation means, is shorter or a communication address of the mobile device whose distance from the communication device is shorter; and a sending means for sending the address book and the notification sequence decided by the deciding means, to the communication device, and the communication device comprises: a receiving means for receiving the address book and the notification sequence; and a notification control means for notifying the user names or the communication addresses registered in the address book received by the receiving means, in accordance with the notification sequence received by the receiving means.

The present invention also provides a program for causing a computer to function as: a storage means for storing plural communication addresses for one user, one of the plural communication addresses being a communication address of a mobile device owned by the user, and one or more of the plural communication addresses other than the communication address of the mobile device, being associated with first location information at which the user communicates using the corresponding communication address; a mobile device location obtaining means for obtaining second location information indicating a location of the mobile device; a deciding means for deciding a notification sequence of the plural communication addresses stored in the storage means so that the notification sequence begins with, from the first location information stored in association with the communication addresses other than the communication address of the mobile device, first location information corresponding with the second location information obtained by the mobile device location obtaining means, or first location indicating a location within a predetermined range from a location indicated by the second location information; and a notification control means for notifying the plural communication addresses in accordance with the notification sequence decided by the deciding means.

The present invention also provides a program for causing a computer to function as: a storage means for storing for each user to communicate, a user name and a communication address of a mobile device owned by the user; a mobile device location obtaining means for obtaining location information of each mobile device whose communication address is stored in the storage means; an own device location obtaining means for obtaining location information of the communication device; a calculation means for calculating a distance between the communication device and the mobile device on the basis of the location information obtained by the mobile device location obtaining means and the location information obtained by the own device location obtaining means; a deciding means for deciding a notification sequence of user names or communication addresses stored in the storage means so that the notification sequence begins with a name of a user owning a mobile device whose distance from the communication device, calculated by the calculation means, is shorter or a communication address of the mobile device whose distance from the communication device is shorter; and a notification control means for notifying the user names or the communication addresses in accordance with the notification sequence decided by the deciding means.

According to the present invention, it is possible to improve convenience of a function of rearranging information registered in an address book and conveying the information.

BRIEF DESCRIPTION OF THE DRAWINGS

FIG. 3 is a diagram showing an embodiment of a data configuration of an address book 16a.

FIG. 6 shows an example of a screen displayed on a mobile phone

FIG. 9 shows an example of a screen displayed on a mobile phone.

FIG. 10 shows an example of a screen displayed on a mobile phone.

FIG. 11 is a flowchart of an indication sequence determining processing carried out in a mobile phone.

FIG. 12 shows an example of a screen displayed on a mobile phone.

DETAILED DESCRIPTION

Figure 1:
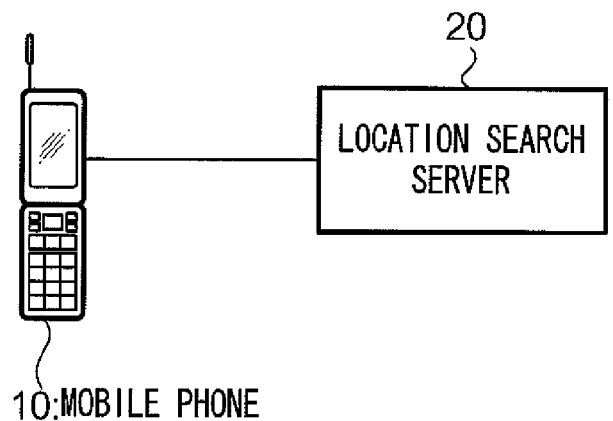
FIG. 1 is a diagram showing a configuration of an embodiment of a communication system

FIG. 1 is a diagram showing a configuration of a communication system according to a first embodiment.

In the drawing, mobile phone 10 is a mobile device covered by a mobile telephone network and a mobile packet communication network, and is provided with a call function, a packet communication function, and a mail function. Mobile phone 10 is also able to perform packet communication with location search server 20 via a mobile packet communication network.

On the other hand, location search server 20, in response to a positioning request from mobile 10, obtains a location of a mobile device to be located, and sends the result of the measurement to mobile phone 10. A mobile device to be located may be a PHS (registered trademark) terminal covered by a simple mobile telephone network or a wireless communication terminal covered by a public wireless LAN. In the present specification, it is assumed that a mobile device to be located is a mobile phone covered by a mobile telephone network or a mobile packet communication network, as in the case of mobile phone 10. Location search server 20 obtains a location of a mobile phone to be located, using, for example, any one of methods (A) to (D) described below.

(A) In a case where a mobile phone to be located is provided with a GPS receiver, location search server 20 requests the mobile phone to carry out a positioning processing using a GPS receiver, and to send the result of the positioning to location search server 20.

(B) Location search server 20 communicates with a service control station provided in a mobile telephone network or a mobile packet communication network to obtain a switch ID registered in a home memory in association with a mobile phone to be located.

(C) Location search server 20 communicates with a mobile phone to be located, to obtain identification information (base station ID) of a wireless area to which the mobile phone belongs.

(D) Mobile phones, in preparation for a handover, measure strength of radio waves emitted from a base station covering a wireless area to which the mobile phone belongs, and measure strength of radio waves emitted from adjacent base stations. In view of this, location search server 20 communicates with a mobile phone to be located, to obtain information indicating radio wave strengths of three or more base stations measured by the mobile phone, and obtains a location of the mobile phone on the basis of the information and locations of the base stations that are sources of the radio waves.

It is to be noted that location search server 20 has a function of converting a data form of location information to another form to, for example, convert latitude/longitude-form location information to address-form location information, or convert location information such as a switch ID or a base station ID to address-form location information. Location search server 20 using the converting function is able to notify location information to mobile phone 10 in a data form requested by mobile phone 10.

Figure 2:
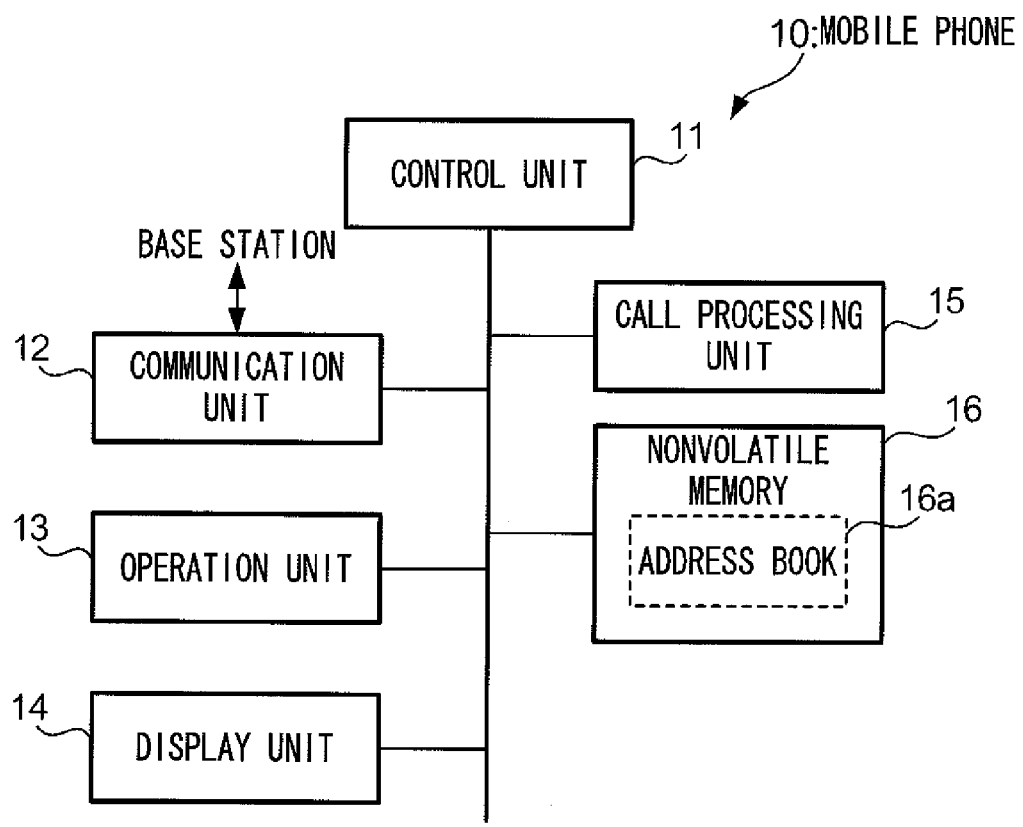
FIG. 2 is a block diagram showing an embodiment of a hardware configuration of mobile phone.

FIG. 2 is a block diagram showing a hardware configuration of mobile phone 10.

In the drawing, control unit 11 includes a CPU, a ROM, and a RAM, and executes a program stored in the ROM or nonvolatile memory 16 to control components of mobile phone 10. Communication unit 12 communicates with a base station of a mobile telephone network or a mobile packet communication network. Operation unit 13 includes a numeric keypad for inputting numbers or characters and a cursor key, and outputs an operation signal to control unit 11. Display unit 14 comprises an LCD. Call processing unit 15 includes a microphone, a speaker, and a speech-processing unit, and performs a call processing. In nonvolatile memory 16, an operating system, a mailer, and application software for managing an address book are installed. In nonvolatile memory 16, address book 16*a* is stored as well.

In address book 16*a*, telephone numbers and/or mail addresses are registered for people with whom a user communicates using mobile phone 10, such as friends, family members, coworkers etc. For example, as shown in FIG. 3, in address book 16*a*, information on a mobile phone owned by a user, information on a home of the user, and information on an office of the user are registered. As information on a mobile phone, a telephone number and a mail address of the mobile phone are registered. As information on a home, a telephone number of a fixed-line phone located in the home, a mail address of a personal computer located in the home, and an address of the home are registered. As information on an office, a telephone number of the office, a mail address of a personal computer used in the office, and an address of the office are registered.

As described above, in address book 16*a*, three different telephone numbers and three different mail addresses are registered for one user name. Also, for a telephone number and a mail address of a home, an address of the home is registered as location information of a location at which a user (other person) performs communication using the communication addresses. Also, for a telephone number and a mail address of an office, an address of the office is registered as location information of a location at which a user (other person) performs communication using the communication addresses.

Figure 4:
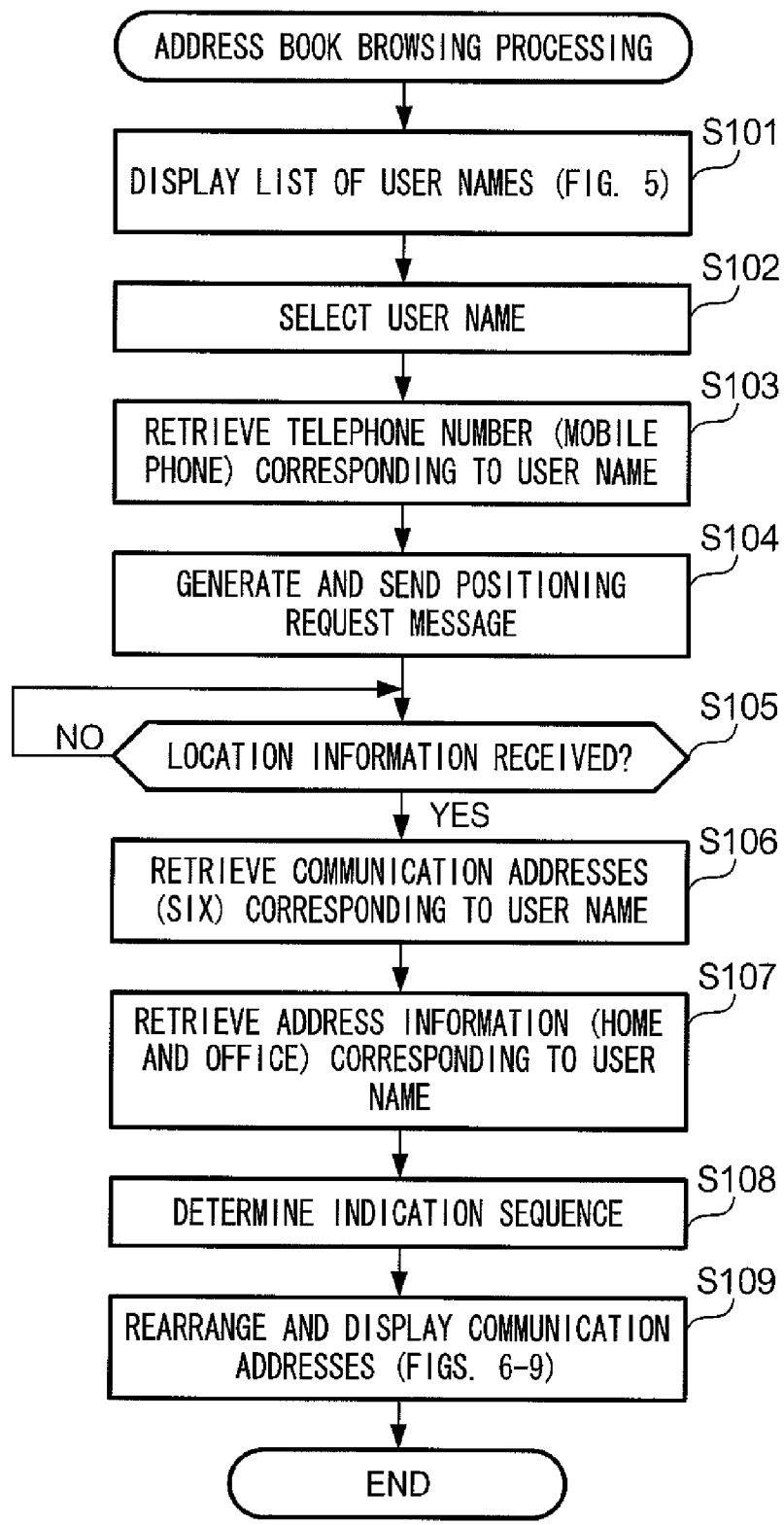
FIG. 4 is a flowchart of an address book browsing processing carried out in a mobile phone.

FIG. 4 is a flowchart showing an address book browsing processing carried out in mobile phone 10. The address book browsing processing is carried out by control unit 11, if operation unit 13 is operated to order browsing of address book 16*a*.

Figure 5:
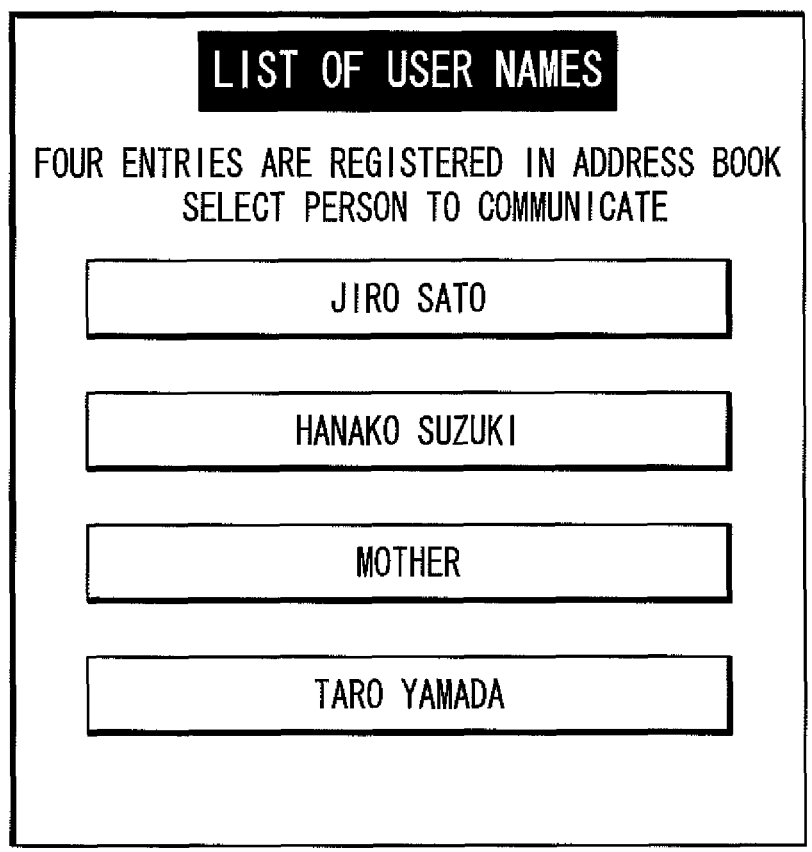
FIG. 5 shows an example of a screen displayed on a mobile phone.

As shown in the drawing, control unit 11 initially displays a list of user names registered in address book 16*a* on display unit 14, as shown in FIG. 5 (step S101). When the list is displayed, the user names are arranged in a predetermined order, such as alphabetical order or an order of registration in address book 16*a*. Subsequently, control unit 11, if operation unit 13 is operated to select one of the user names in the list (step S102), initially retrieves a telephone number of a mobile phone registered in address book 16*a* in association with the selected user name (step S103). For example, if "Taro Yamada" is selected in the example of a screen shown in FIG. 5, control unit 11 retrieves a telephone number "090-1111-1111" of a mobile phone of "Taro Yamada" registered in address book 16*a* (FIG. 2).

Subsequently, control unit 11 generates a positioning request message including the retrieved telephone number of a mobile phone and information specifying a desired data form (e.g., address form) of location information, and sends the message to location search server 20 via communication unit 12 (step S104). Namely, mobile phone 10 inquires of location search server 20 for location information of a mobile phone owned by the person selected by the user. It is to be noted that the telephone number of a mobile phone used for generating the positioning request message is merely an example of information for specifying a mobile phone to be located, and can be substituted with a mail address of a mobile phone.

The positioning request message sent from mobile phone 10 is transferred to location search server 20 via a mobile packet communication network. Location search server 20, on receipt of the positioning request message, measures a location of a mobile phone identified by the telephone number included in the message, using one of the above-mentioned methods (A) to (D). Location search server 20 also sends location information of the mobile phone obtained as a result of the measurement, to mobile phone 10. It is to be noted that, as described above, location search server 20 has a function of converting a data form of location information, and using the conversion function, is able to provide location information to mobile phone 10 in a data form requested by mobile phone 10.

Control unit 11 of mobile phone 10, on receipt of the location information of the mobile phone from location search server 20 (step S105: YES), initially retrieves a total of six communication addresses registered in address book 16*a* in association with the user name selected at step S102 (step S106). Control unit 11 also retrieves addresses of a home and an office registered in address book 16*a* in association with the user name selected at step S102 (step S107). Subsequently, control unit 11 determines an indication sequence of the six communication addresses retrieved at step S106, by comparing the addresses of a home and an office retrieved at step S107 and the location information (a current location of the other person) of the mobile phone received from location search server 20 (step S108). After that, control unit 11 displays the six communication addresses in the determined indication sequence on display unit 14 (step S109), and ends the address book browsing processing.

For example, in a case where a user name "Taro Yamada" is selected at step S102, and address-form location information "11-1, Nagata-cho 2-chome, Chiyoda-ku, Tokyo" is received from location search server 20 at step S105, since the received location information corresponds with an address of an office of "Taro Yamada" registered in address book 16*a*, it is found that "Taro Yamada" is in the office. In this case, an indication sequence of the six communication addresses registered in address book 16*a* in connection with "Taro Yamada" will be, for example, as follows: first, a telephone number of an office; second, a mail address of an office; third, a telephone number of a mobile phone; fourth, a mail address of a mobile phone; fifth, a telephone number of a home; and sixth, a mail address of a home, as shown in FIG. 6(a). Namely, a notification order will be employed that begins with a communication address corresponding to an address identical to that obtained from location search server 20, among plural addresses registered in address book 16a.

It is to be noted that in the case where the other person is in the office, there is no point in making a phone call to his/her home. Accordingly, as shown in FIG. 6(b), an indication sequence level of a telephone number of a home may be set at the bottom (sixth level), or a configuration may be employed to display a message reporting that the other person cannot be contacted, if a phone call is made to his/her home at the present moment.

Figure 7:
FIG. 7 shows an example of a screen displayed on a mobile phone.

Alternatively, in a case where "Taro Yamada" is selected at step S102, and information "13-1, Shimomaruko 2-chome, Ohta-ku, Tokyo" is received from location search server 20 at step S105, it is found from address book 16a that "Taro Yamada" is at his home. In this case, an indication sequence of communication addresses will be, for example, as follows: first, a telephone number of a home; second, a mail address of a home; third, a telephone number of a mobile phone; fourth, a mail address of a mobile phone; fifth, a mail address of an office; and sixth, a telephone number of an office, as shown in FIG. 7. In this case, also, a notification order will be employed which begins with a communication address corresponding to an address identical to that obtained from location search server 20, among plural addresses registered in address book 16a.

Figure 8:
FIG. 8 shows an example of a screen displayed on a mobile phone.

Alternatively, in a case where "Taro Yamada" is selected at step S102, and information "9-1, Marunouchi 1-chome, Chiyoda-ku, Tokyo" is received from location search server 20 at step S105, it is found that "Taro Yamada" is in a location other than his home or office. In this case, an indication sequence of communication addresses will be as follows: first, a telephone number of a mobile phone; second, a mail address of a mobile phone; third, a mail address of an office; fourth, a mail address of a home; fifth, a telephone number of an office; and sixth, a telephone number of a home, as shown in FIG. 8. In this case, a configuration may be employed to display a message reporting that the other person cannot be contacted, if a phone call is made to his/her office or home at the present moment. Namely, if there is no address identical to that obtained from location search server 20, among plural addresses registered in address book 16a, a notification order will be employed that begins with a communication address of a mobile phone.

Further, in a case where "Taro Yamada" is not at his home but is relatively close to his home, an indication sequence of communication addresses will be, for example, as follows: first, a telephone number of a mobile phone; second, a mail address of a telephone number; third, a mail address of a home; fourth, a mail address of an office; fifth, a telephone number of a home; and sixth, a telephone number of an office, as shown in FIG. 9(a). Similarly, in a case where "Taro Yamada" is not at his office but is relatively close to his office, an indication sequence of communication addresses will be, for example, as follows: first, a telephone number of a mobile phone; second, a mail address of a mobile phone; third, a mail address of an office; fourth, a mail address of a home; fifth, a telephone number of an office; and sixth, a telephone number of a home, as shown in FIG. 9(b). Namely, if there is no address identical to that obtained from location search server 20, among plural addresses registered in address book 16a, a notification order will be employed that begins with a communication address of a mobile phone, and a communication address following the communication address of a mobile phone will be, among the plural addresses registered in address book 16a, a communication address corresponding to an address close to that obtained from location search server 20.

It is to be noted that after ending the address book browsing processing, control unit 11, if operation unit 13 is carried out to select any one of the six communication addresses displayed on display unit 14, starts a communication processing using the selected communication address. For example, control unit 11, if a telephone number is selected, performs a call processing using the selected telephone number. Alternatively, control unit 11, if a mail address is selected, performs a processing for creating an email addressed to the selected mail address, and thereafter sends the created email.

In the above address book browsing processing, location search server 20, if location information cannot be obtained when a main power supply of a mobile phone to be located is in an off-state, or when a mobile phone to be located is outside the area of a mobile telephone network or a mobile packet communication network, notifies mobile phone 10 of the fact. In this case, mobile phone 10 displays on display unit 14 a message reporting that location information of the other person could not be obtained. Also, since in this case, communication using a mobile phone cannot be made with the other person, and even if an email is sent to the mobile phone, the email cannot reach the mobile phone soon, indication sequence levels of a mail address of a telephone number of a mobile phone are set at the bottom (fifth level and sixth level).

As explained in the foregoing, according to the present embodiment, mobile phone 10, if any one of users registered in address book 16a is selected, obtains location information of a mobile phone owned by the selected user from location search server 20. Subsequently, mobile phone 10 determines an indication sequence of six communication addresses registered in address book 16a for the selected user, by comparing location information of his/her home or office registered in address book 16a and location information of the mobile phone obtained from location search server 20.

Accordingly, mobile phone 10 is, for example, if the other person is in his/her office, able to preferentially display a telephone number or a mail address of the office, and if the other person is in his/her home, able to preferentially display a telephone number or a mail address of the home. Also, mobile phone 10 is, if the other person is in a location other than his/her office or home, able to preferentially display a telephone number or a mail address of a mobile phone owned by the other person. Namely, according to the present embodiment, mobile phone 10 is able to consider a present location of the other person, and preferentially display a communication address via which contact with the other person is likely to be made. Accordingly, a user is able easily to select a communication address via which contact with the other person is likely to be made, and to start communication using it. Also, a necessity of remaking a phone call is avoided, and accordingly, wasteful communication charges are lower than before.

(1) The displaying of communication addresses after rearranging them may employ, instead of the configuration in which six communication addresses are displayed at a time, as shown in FIGS. 6 to 9, a configuration in which communication addresses are displayed one by one in order of indication sequence level. Also, in address book 16a, not all of a total of six communication addresses may be registered for one user. It is only necessary to register two or more communication addresses including a communication address of a mobile phone (a telephone number or a mail address).

(2) Mobile phone 10 may be configured, instead of contacting location search server 20 to obtain location information of a mobile phone of the other person, to directly contact the mobile phone of the other person to obtain the location information. Also, in the above embodiment, where address-form location information is used, latitude/longitude-form location information may be used, or a switch ID or a base station ID may be used as location information. However, in a case where location information other than address-form one is used, mobile phone 10 has to convert address information of a home or an office registered in address book 16a, into latitude/longitude-form location information, for example, by making a request to location search server 20.

Also, in the above embodiment, where a notification order is determined that begins with a communication address corresponding to an address identical to that obtained from location search server 20, among plural addresses registered in address book 16a, the two addresses may not be completely identical to each other. If the two addresses are included in a predetermined range (predetermined substantially narrow range), they may be considered to be identical to each other.

(3) Mobile phone 10 may be configured, when determining an indication sequence of communication addresses, to use a current time, in addition to location information of a home or an office registered in address book 16a and location information of a mobile phone obtained from location search server 20. In this case, mobile phone 10 is provided with a time-keeping function for storing a time (year, month, date, hour, minute, second) such as a timer. If mobile phone 10 is configured to determine an indication sequence of communication addresses in consideration of a current time, for example, in a case of an indication sequence of communication addresses shown in FIG. 7, since a contact by phone is considered to be undesirable in the middle of the night or in the early morning (e.g., from midnight to 6 a.m.), unless the contact is urgent and important, displaying of a mail address is prioritized over that of a telephone number. For example, an indication sequence of communication addresses may be as follows: first, a mail address of a home; second, a telephone number of a home; third, a mail address of a mobile phone; fourth, a telephone number of a mobile phone; fifth, a mail address of an office; and sixth, a telephone number of an office, as shown in FIG. 10(a). Alternatively, an indication sequence of communication addresses may be as follows: first, a mail address of a home; second, a mail address of a mobile phone; third, a mail address of an office; fourth, a telephone number of a home; fifth, a telephone number of a mobile phone; and sixth, a telephone number of an office, as shown in FIG. 10(b).

(4) In the case of determining an indication sequence of communication addresses in consideration of a current time, as described above, for example, if the other person selected from address book 16a is in a foreign country, while mobile phone 10 and its user are in Japan, a case is considered where even if a current time (Japan time) kept in mobile phone 10 is 1 p.m. (daytime), a local time of the country in which the other person is, is 1 a.m. (late-evening). Accordingly, mobile phone 10 may be configured, when the other person is in a foreign country, to correct a current time to be used for determining an indication sequence of communication addresses, to a local time of the country in which the other person is.

In this case, mobile phone 10, on receipt of location information from location search server 20, initially determines whether the other person is in a foreign country on the basis of the received location information. For example, address-form location information such as "11-1, Nagata-cho 2-chome, Chiyoda-ku, Tokyo" or " . . . New York, the United States" is sent from location search server 20, mobile phone 10 determines whether the other person is in a foreign country on the basis of the address information. If the other person is in a foreign country, mobile phone 10 obtains a time difference with a location indicated by the received address information. For example, mobile phone 10 may pre-store a data table storing information on time differences between Japan and different parts of the world, in nonvolatile memory 16, and obtain a time difference on the basis of received address information, with reference to the data table. Alternatively, mobile phone 10 may be configured to contact a server provided with the above data table to obtain information on a time difference.

Mobile phone 10, after correcting a current time being kept, by an amount of the time difference, determines an indication sequence of communication addresses on the basis of location information of a home or an office registered in address book 16a, location information of a mobile phone obtained from location search server 20, and the corrected time information. According to the configuration, if the other person is in a foreign country, and the local time is, for example, late-evening, it is possible to prioritize displaying of a mail address over that of a telephone number.

Since in the United States, there is a large difference in time, for example, between the West Coast and the East Coast, it is preferable to correct a time difference even in an identical country. In this case, mobile phone 10 may inquire of location search server 20 of a location of mobile phone 10, in addition to a location of a mobile phone owned by the other person. After that, mobile phone 10 obtains a time difference between the location in which mobile phone 10 is and the location in which the other person is, on the basis of the location information of mobile phone 10 and the location information of the mobile phone of the other person, obtained from location search server 20. When obtaining a time difference, mobile phone 10 refers to the above-mentioned data table, or contacts a server that is able to calculate a time difference between two points. Mobile phone 10, after correcting a current time being kept, by an amount of the time difference, uses the corrected time as time information for determining an indication sequence of communication addresses. It is to be noted that it is obvious that mobile phone 10 may, instead of contacting location search server 20 to obtain location information of mobile phone 10, be configured to measure a location by itself, for example, using a GPS receiver. Alternatively, mobile phone 10 may urge a user to input address information of a present location, and use the address information input in response, as location information of mobile phone 10.

Now, in a second embodiment, a case is described where user names registered in an address book are rearranged and displayed on the basis of a distance from the other person. It is to be noted that hardware configurations of a mobile phone and a location search server according to the present embodiment are the same as those described in the first embodiment; accordingly, description of the hardware configurations will be omitted, and like signs are used.

FIG. 11 is a flowchart of an indication sequence determining processing carried out in mobile phone 10. The indication sequence determining processing is, for example, periodically (e.g., at fifteen-minute intervals) carried out when a mail power supply of mobile phone 10 is an on state.

As shown in the drawing, when the indication sequence determining processing is started, control unit 11 initially retrieves a telephone number of mobile phone 10 and telephone numbers of all mobile phones registered in address book 16*a* (steps S201 and S202). For example, in a case where telephone numbers of four mobile phones are registered in address book 16*a*, a total of five telephone numbers, including a telephone number of mobile phone 10, will be retrieved. Subsequently, control unit 11 generates a positioning request message including all the retrieved telephone numbers and information specifying a desired data form of location information, and sends the message to location search server 20 (step S203). Namely, mobile phone 10 inquires of location search server 20 for location information of mobile phones registered in address book 16*a* and location information of mobile phone 10. It is to be noted that, as described in the first embodiment, the telephone numbers of mobile phones used for generating the positioning request message can be substituted with mail addresses of the mobile phones.

Location search server 20, on receipt of the positioning request message, obtains location information of the mobile phones (including mobile phone 10) which was requested by mobile phone 10, using one of the above-mentioned methods (A) to (D), and sends the location information to mobile phone 10.

Control unit 11 of mobile phone 10, on receipt of the location information of the mobile phones registered in address book 16*a* and the location information of mobile phone 10 from location search server 20 (step S204: YES), initially calculates a distance between mobile phone 10 and each of the mobile phones on the basis of the received location information (step S205). For example, in a case where four mobile phones: mobile phone A, mobile phone B, mobile phone C, and mobile phone D are registered in address book 16*a*, control unit 11 calculates a distance between mobile phone 10 and mobile phone A on the basis of location information of mobile phone 10 and location information of mobile phone A. Also, control unit 11 calculates a distance between mobile phone 10 and mobile phone B on the basis of location information of mobile phone 10 and location information of mobile phone B. The same calculation is made for each of mobile phones C and D.

Control unit 11, after calculating a distance from each of the mobile phones registered in address book 16*a*, determines an indication sequence of user names registered in address book 16*a* so that the user names are arranged in ascending order of distance from each mobile phone calculated at step S205 (namely, in ascending order of distance from the other person) (step S206). For example, in a case where a distance from mobile phone A (user name: Taro Yamada) is 5.2 km, a distance from mobile phone B (user name: Hanako Suzuki) is 15.7 km, a distance from mobile phone C (user name: Jiro Sato) is 0.8 km, a distance from mobile phone D (user name: mother) is 7.1 km, control unit 11 will determine an indication sequence as follows: first, Jiro Sato; second, Taro Yamada; third, mother; and fourth, Hanako Suzuki. Control unit 11, after generating indication sequence specifying data specifying the indication sequence of the user names determined at step S106 and storing the data in nonvolatile memory 16 (step S207), ends the indication sequence determining processing.

It is to be noted that since the indication sequence determining processing shown in FIG. 11 is periodically carried out, indication sequence specifying data stored in nonvolatile memory 16 is updated each time an indication sequence determining processing is carried out. In mobile phone 10, if a user operates operation unit 13 to order browsing of address book 16*a*, control unit 11 retrieves the indication sequence specifying data from nonvolatile memory 16. Subsequently, control unit 11 displays on display unit 14 the user names registered in address book 16*a*, in accordance with the indication sequence specified by the retrieved indication sequence specifying data, for example, as shown in FIG. 12(*a*). As shown in FIG. 12(*b*), together with the user name, the distances from the other persons calculated at step S205 may be displayed.

After the list of the user names registered in address book 16*a* is thus displayed, if a user operates operation unit 13 to select one of the user names in the list, control unit 11 retrieves six communication addresses registered in address book 16*a* in association with the selected user name, and displays the addresses on display unit 14.

When the six communication addresses are displayed, they may be rearranged on the basis of a current position of the other person, as in the case of the first embodiment. Alternatively, the communication addresses may be rearranged in a predetermined order.

In the above indication sequence determining processing, location search server 20, if location information cannot be obtained when a main power supply of a mobile phone to be located is in an off-state, or when a mobile phone to be located is outside the area of a mobile telephone network or a mobile packet communication network, notifies mobile phone 10 of the fact. In this case, mobile phone 10 displays on display unit 14 a message reporting that location information of the other person could not be obtained. Also, in this case, mobile phone 10 sets an indication sequence level of a corresponding user name at the bottom.

As explained in the foregoing, according to the present embodiment, mobile phone 10 obtains location information of mobile phones registered in address book 16*a* and location information of mobile phone 10 from location search server 20, and calculates a distance from each of the mobile phones. Subsequently, mobile phone 10 determines an indication sequence of user names registered in address book 16*a* so that the user names are arranged in ascending order of the calculated distance (namely, in ascending order of distance from the other person). Such an indication sequence in which user names registered in address book 16*a* are arranged in an ascending order of distance from the other person is effective, for example, in a case where a party is suddenly planned, and a necessity to gather together nearby friends arises, or a case where a necessity to contact a nearby friend to arrange to meet arises.

It is to be noted that an indication sequence of user names may be, instead of an ascending order of distance from the other person, a descending order of distance from the other person.

(1) In the second embodiment, an indication sequence determining processing is periodically carried out when a main power supply of mobile phone 10 is in an on-state, to reduce a time elapsing after browsing of address book 16*a* is instructed, until a list of user names based on the other persons is displayed. However, mobile phone 10 may be configured to, after browsing of address book 16*a* is instructed, inquire location search server 20 of location information of mobile phones registered in address book 16*a* and location information of mobile phone 10, and determine an indication sequence of user names.

(2) In the second embodiment, in address book 16*a*, it is only necessary to register for one user a minimum of a user name and a communication address (a telephone number or a mail address) of a mobile phone owned by the user. Namely, in address book 16*a* used in the second embodiment, there is no need to register information on a home (a telephone number, a mail address, or an address) or information on an office (a telephone number, a mail address, or an address). Also, in the second embodiment, mobile phone 10 may be configured to rearrange and display, instead of user names, communication addresses of mobile phones registered in address book 16*a*.

(3) Mobile phone 10 may be configured to pre-notify communication addresses of mobile phones registered in address book 16*a* and communication addresses of mobile phone 10 to location search server 20, and location search server 20 may obtain location information of the mobile phones (including mobile phone 10) notified by mobile phone 10 at predetermined intervals (e.g., at fifteen-minute intervals), and store the information in a storage device. In this case, location search server 20, in response to a positioning request from mobile phone 10, retrieves latest location information of the mobile phones from the storage device, and sends the information to mobile phone 10. According to the configuration, it is possible to substantially reduce a time for obtaining location information via location search server 20.

(4) Mobile phone 10 may, instead of contacting location search server 20 to obtain location information of mobile phone 10, measure a location by itself. For example, if mobile phone 10 is provided with a GPS receiver, the mobile phone is able to measure its own location using the GPS receiver. Alternatively, mobile phone 10 may measure strength each of radio waves emitted from three or more base stations, and calculate a location of mobile phone 10 on the basis of the result of the measurement and locations of the base stations that are sources of the radio waves. Alternatively, mobile phone 10 may use identification information (an ID of a base station) of a wireless area to which mobile phone 10 belongs, or a switch ID as location information. Further, mobile phone 10 may urge a user to input address information of a present location, and use the address information input in response, as location information of mobile phone 10.

(5) In the second embodiment, all user names registered in address book 16*a* are rearranged. According to the configuration, for example, if 100 user names are registered in address book 16*a*, mobile phone 10 has to obtain location information of a total of 101 mobile phones, including location information of mobile phone 10. Accordingly, a lot of time is required to rearrange and display the user names.

In view of this, a configuration may be employed in which plural user names to be arranged and displayed are specified among user names registered in address book 16*a*. For example, among 100 user names registered in address book 16*a*, only five user names, which have been selected by a user of mobile phone 10 by operating operation unit 13, may be rearranged and displayed. In this case, mobile phone 10 only has to obtain location information of a total of six mobile phones including the selected five mobile phones and mobile phone 10.

Alternatively, among 100 user names registered in address book 16*a*, control unit 11 may select top ten user names in terms of communication frequency, and rearrange and display only the ten user names. In this case, mobile phone 10 has, in nonvolatile memory 16, a transmission history table in which each time a phone call is made or a mail is sent, a user name or a communication address of the other person is stored, and a receipt history table in which each time a phone call is received or a mail is received, a user name or a communication address of the other person is stored. Control unit 11, by referring to the transmission history table and the receipt history table, selects top ten user names in terms of communication frequency, among 100 user names registered in address book 16*a*.

It is to be noted that control unit 11 may be configured to refer to only the transmission history table for selecting names of users that are frequently communicated, or to refer to only the receipt history table for selecting names of users that are frequently communicated. Also, the transmission history table and the receipt history table may be combined into a communication history table. Also, the number of user names selected by a user by operating operation unit 13 or the number of user names automatically selected by control unit 11 on the basis of communication frequency is not limited to the above examples, but may be arbitrarily set.

Figure 13:
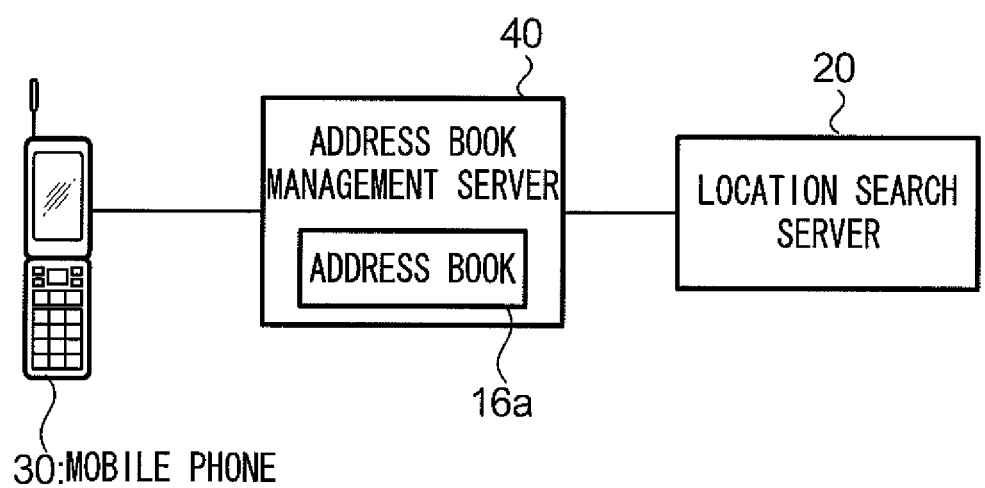
FIG. 13 is a diagram showing a configuration of a communication system.

For example, address book management server 40 may be provided between mobile phone 30 and location search server 20, as shown in FIG. 13, address book 16*a* (see FIG. 3) may be stored in address book management server 40, not mobile phone 30, and mobile phone 30 may, if necessary, access address book management server 40 to browse address book 16*a*. In this case, address book management server 40, after communicating with location search server 20, determines an indication sequence of communication addresses registered in address book 16*a*.

Figure 14:
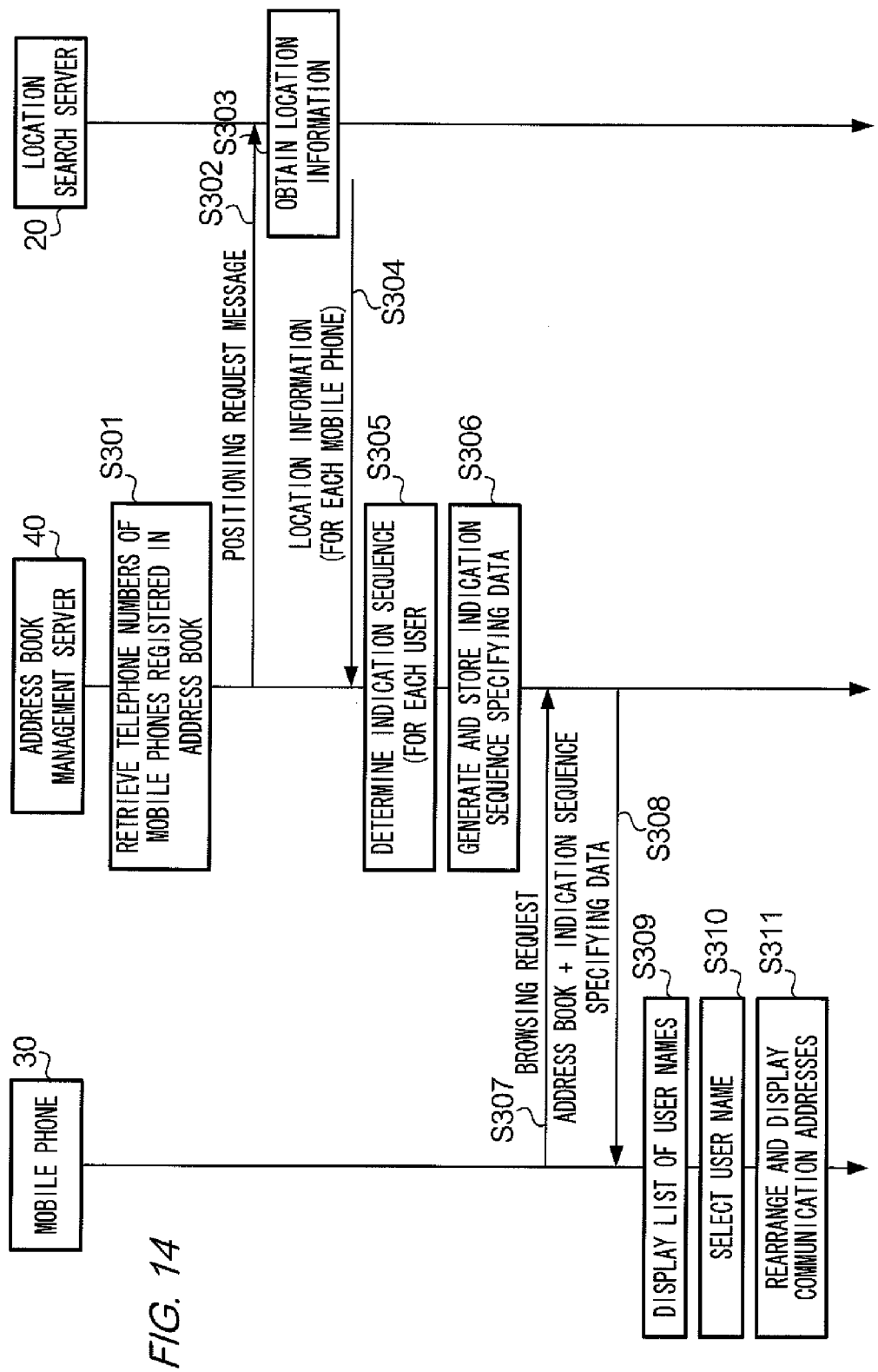
FIG. 14 is a sequence chart showing operations of a mobile phone and address book management server.

FIG. 14 is a sequence chart showing operations of mobile phone 30 and address book management server 40 according to the third embodiment. It is to be noted that in the following description of the operations, descriptions of portions shared with the first embodiment will be simplified.

As shown in the drawing, address book management server 40 initially retrieves telephone numbers of all mobile phones registered in address book 16*a* for mobile phone 30 (step S301). Subsequently, address book management server 40 generates a positioning request message including all the retrieved telephone numbers, and sends the message to location search server 20 (step S302). Namely, address book management server 40 inquires of location search server 20 about location information of mobile phones registered in address book 16*a*. Location search server 20 obtains location information of the mobile phones that was requested by address book management server 40, using one of the above-mentioned methods (A) to (D) (step S303), and sends the location information to address book management server 40 (step S304).

Address book management server 40, on receipt of the location information of the mobile phones registered in address book 16*a*, determines an indication sequence of six communication addresses for each of the users registered in address book 16*a*, by comparing location information of a home or an office of a user and location information of a mobile phone owned by the user, received from location search server 20 (step S305). After that, address book management server 40 generates indication sequence specifying data specifying an indication sequence of communication addresses (for each user), and stores the data in its own device 40 (step S306).

For example, in a case where three users: user A, user B, and user C are registered in address book 16*a*, indication sequence specifying data will include data specifying an indication sequence of six communication addresses for user A, data specifying an indication sequence of six communication addresses for user B, and data specifying an indication sequence of six communication addresses for user C. It is to be noted that address book management server 40 periodically (e.g., at fifteen-minute intervals) performs the processings of steps S301 to S306. Accordingly, indication sequence specifying data stored in address book management server 40 is updated each time the processings of steps S301 to S306 are carried out.

In mobile phone 30, if a user operates an operation unit to order browsing of address book 16*a*, a request for browsing address book 16*a* is sent to address book management server 40 (step S307). Address book management server 40, in response to the browsing request from mobile phone 30, retrieves address book 16a and indication sequence specifying data stored in the server 40, and sends them to mobile phone 30 (step S308). Mobile phone 30, on receipt of address book 16a and the indication sequence specifying data, initially displays a list of user names registered in the received address book 16a (step S309). When the list is displayed, the user names are arranged in a predetermined order, such as alphabetical order. Subsequently, mobile phone 30, if an operation unit is operated to select one of the user names in the list (step S310), displays on a screen six communication addresses registered in address book 16a in association with the user name, in accordance with an indication sequence for the user selected at step S310, among the indication sequence specifying data received from address book management server 40 (step S311).

Also, mobile phone 30, if the operation unit is operated to select one of the displayed six communication addresses, starts a communication processing using the selected communication address. For example, mobile phone 30, if a telephone number is selected, performs a call processing using the selected telephone number. Alternatively, mobile phone 30, if a mail address is selected, performs a processing for creating an email addressed to the selected mail address, and sends the generated email.

The configuration described in the foregoing produces effects similar to those of the first embodiment. In addition, since address book 16a of mobile phone 30 is managed in address book management server 40, and most of the processing related to rearranging and displaying of communication addresses is performed in the same server, it is possible to substantially reduce a processing load on mobile phone 30 as compared with the configuration of the first embodiment. It is to be noted that contents of "Modifications of First Embodiment" may be applied to the present embodiment by replacing "mobile phone 10" with "address book management server 40."

In a case where the system configuration shown in FIG. 13 is employed, in address book management server 40, an indication sequence of user names registered in address book 16a may be determined on the basis of a distance from the other person.

Figure 15:
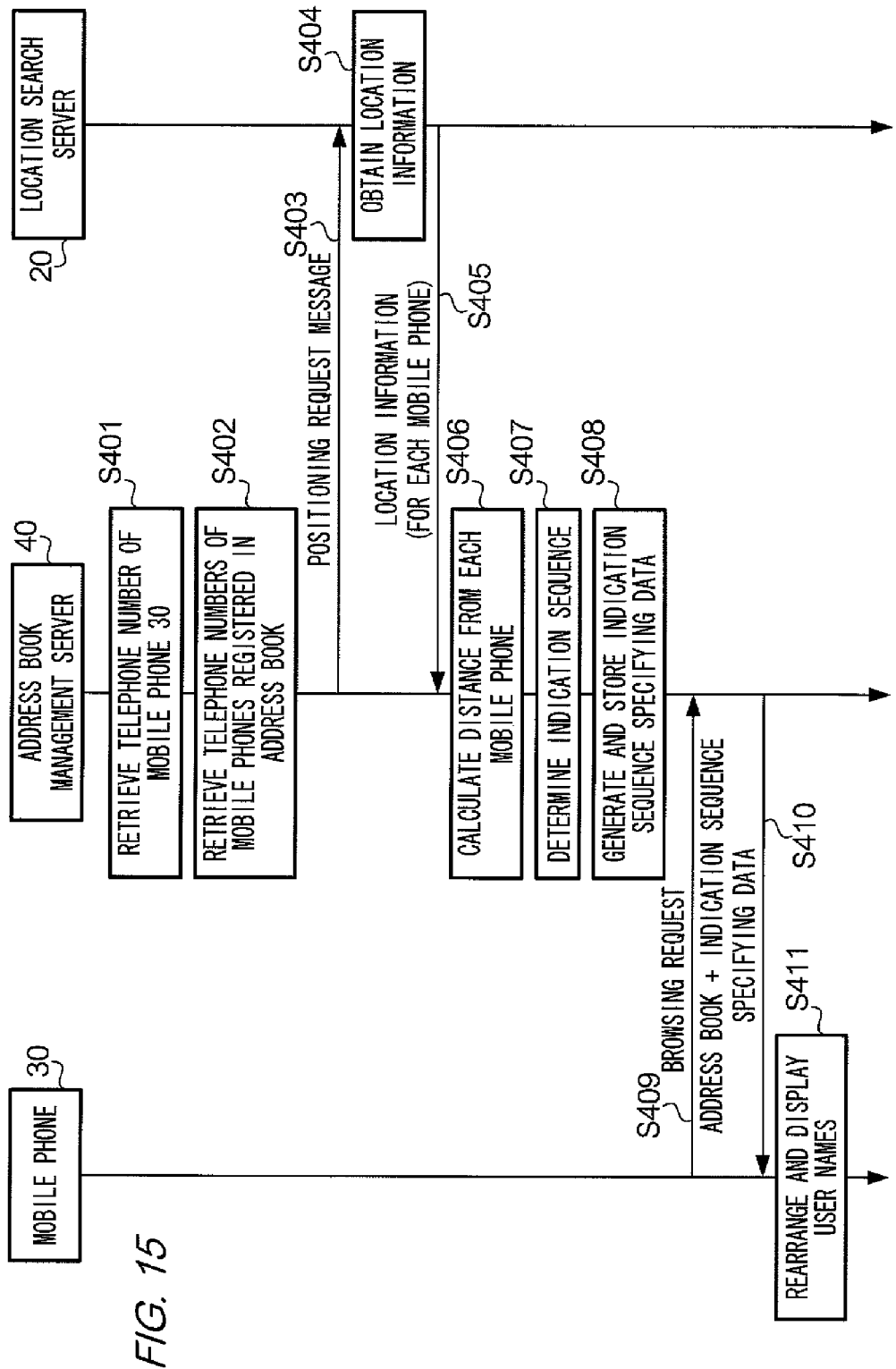
FIG. 15 is a sequence chart showing operations of a mobile phone and address book management.

FIG. 15 is a sequence chart showing operations of mobile phone 30 and address book management server 40 according to a fourth embodiment. It is to be noted that in the following description of the operations, descriptions of portions shared with the second embodiment will be simplified.

As shown in the drawing, address book management server 40 initially retrieves a telephone number of mobile phone 30 and telephone numbers of all mobile phones registered in address book 16a for mobile phone 30 (steps S401 and S402). Subsequently, address book management server 40 generates a positioning request message including all the retrieved telephone numbers, and sends the message to location search server 20 (step S403). Namely, address book management server 40 inquires of location search server 20 about location information of mobile phone 30 and location information of mobile phones registered in address book 16a. Location search server 20 obtains location information of the mobile phones (including mobile phone 30) requested by address book management server 40 (step S404), and sends the information to address book management server 40 (step S405).

Address book management server 40, on receipt of the location information of the mobile phones registered in address book 16a and the location information of mobile phone 30 from location search server 20, initially calculates a distance between mobile phone 30 and each of the mobile phones on the basis of the received location information (step S406). Subsequently, address book management server 40 determines an indication sequence of user names registered in address book 16a so that the user names are arranged in ascending order of distance from each mobile phone calculated at step S406 (namely, in ascending order of distance from the other person) (step S407). After that, address book management server 40 generates indication sequence specifying data specifying the indication sequence of the user names, and stores the data in its own device 40 (step S408). It is to be noted that address book management server 40 periodically (e.g., at fifteen-minute intervals) performs the processings of steps S401 to S408. Accordingly, indication sequence specifying data stored in address book management server 40 is updated each time the processings of steps S401 to S408 are carried out.

In mobile phone 30, if a user operates an operation unit to order browsing of address book 16a, a request for browsing address book 16a is sent to address book management server 40 (step S409). Address book management server 40, in response to the browsing request from mobile phone 30, retrieves address book 16a and indication sequence specifying data stored in the server 40, and sends them to mobile phone 30 (step S410). Mobile phone 30, on receipt of address book 16a and the indication sequence specifying data, displays on a screen the user names registered in address book 16a, in accordance with the indication sequence specified by the indication sequence specifying data (step S411).

After the list of the user names registered in address book 16a is displayed, if a user performs the operation unit to select one of the user names in the list, mobile phone 30 retrieves and displays six communication addresses registered in address book 16a in association with the selected user name. When the six communication addresses are displayed, they may be rearranged on the basis of a current position of the other person, as in the case of the third embodiment. Alternatively, the communication addresses may be rearranged in a predetermined order.

It is to be noted that an indication sequence of user names may be, instead of in ascending order of distance from the other person, in descending order of distance from the other person.

The configuration described in the foregoing produces effects similar to those of the second embodiment. In addition, since address book 16a of mobile phone 30 is managed in address book management server 40, and most of the processing related to rearranging and displaying of communication addresses based on a distance from the other person is performed in the same server, it is possible to substantially reduce processing load on mobile phone 30 as compared with the configuration of the second embodiment. It is to be noted that contents of "Modifications of Second Embodiment" may be applied to the present embodiment by replacing "mobile phone 10" with "address book management server 40."

(1) In the first embodiment, for example, when location search server 20 measures a location of a mobile phone owned by another person registered in address book 16a in response to an inquiry from mobile phone 10, if the other person is outside a communication area of a mobile telephone network or a mobile packet communication network (e.g., the other person is moving through a tunnel of an expressway or moving by subway), even when the mobile station owned by the other person is on, location search server 20 is not able to obtain a current location of the mobile phone.

To deal with such a situation, location search server 20 may be configured to obtain periodically (e.g., at fifteen-minute intervals) a location of each mobile phone registered in address book 16*a*, store the obtained location information in a memory in association with a time (year, month, date, hour, minute, second) at which the information was obtained, and if an inquiry is received from mobile phone 10, retrieve location information of a corresponding mobile phone from the memory, which has been most lately obtained, to send the information to mobile phone 10. In this case, it is obvious that location search server 20 has to be provided with a function for keeping a current time, such as a timer.

It is to be noted that a time cycle in which location information is obtained may be not necessarily constant. For example, in a case where traffic in a mobile packet communication network is lower than or equal to a predetermined threshold value (namely, the network is relatively uncongested), location information may be obtained at relatively short intervals (e.g., at fifteen-minute intervals), and in a case where traffic in a mobile packet communication network is larger than the threshold value, a time interval at which location information is obtained may be set to be longer than that in the case where a traffic is lower than or equal to the predetermined threshold value, or obtaining of location information may be postponed until the traffic is lower than or equal to the predetermined threshold value. In a case where a switch ID or a base station ID is used as location information, only when a switch ID or a base station ID changes in response to movement of a mobile phone, a new switch ID or base station ID may be stored in a memory in association with time information indicating a time of the change.

It is also to be noted that the device that obtains location information of mobile phones registered in address book 16*a* at predetermined intervals, and stores the information in a memory together with a time at which the information was obtained may be mobile phone 10, instead of location search server 20.

According to the configuration in which location information and a time at which the information has been obtained are sequentially stored in a memory for each of mobile phones registered in address book 16*a*, it is possible, by using a history of location information stored in the memory, to predict a current location of a mobile phone of the other person. Specifically, on the basis of a history of location information stored in the memory, it is possible to estimate a moving distance and direction during a time period between a latest time at which location information has been obtained and a current time, and by adding the information to the latest location information, it is possible to estimate a current location of a mobile phone of the other person. Accordingly, a configuration may be employed in which instead of location information that has been most recently obtained, a current location obtained through prediction processing is used.

The above modifications may be applied to each of the following cases: (A) in the second embodiment, location information of mobile phones registered in address book 16*a*, or location information of mobile phone 10 is obtained; (B) in the third embodiment, address book management server 40 obtains location information of mobile phones registered in address book 16*a*; and (C) in the fourth embodiment, address book management server 40 obtains location information of mobile phones registered in address book 16*a* and location information of mobile phone 30. Namely, in the second to fourth embodiment, it may be possible to obtain location information of mobile phones registered in address book 16*a* or an own device at predetermined intervals (e.g., at fifteen-minute intervals), and store the location information in a memory in association with a time at which the information has been obtained. It may be also possible, when location information is obtained, to retrieve location information whose obtaining time is most recent from a memory to use the information, or to estimate a current location on the basis of a history of location information stored in a memory to use the estimated current location.

If mobile phone 10 is provided with, in addition to the function of obtaining own location information at predetermined intervals and storing the information in nonvolatile memory 16 in association with a time at which the information has been obtained, an acceleration sensor and a function of successively storing an acceleration value measured using the acceleration sensor in nonvolatile memory 16; in the second embodiment, mobile phone 10, when obtaining own location information, is able to estimate its own current location by referring to nonvolatile memory 16 to use location information whose obtaining time is most recent among location information stored therein and acceleration values measured using the acceleration sensor after the obtaining time associated with the latest location information.

(2) In the above first to fourth embodiments, in address book 16*a* (see FIG. 3), data other than addresses of a home and an office may be registered, and the addresses of a home and an office may be registered in a separately-provided address list in association with a user name. In this case, by referring to both an address book and an address list, location information of a home or an office can be identified for each other person registered in the address book.

At step S308 of the above third embodiment or step S410 of the fourth embodiment, address book management server 40 may be configured to send, instead of address book 16*a*, only communication addresses (or user names) to be rearranged and displayed, to mobile phone 30, together with indication sequence specifying data specifying an indication sequence of the communication addresses.

(3) Mobile phone 10 may be provided with, in relation to browsing of address book 16*a*, a normal display mode in which communication addresses or user names registered in address book 16*a* are at predetermined indication sequence such as in alphabetical order or in order of registration in address book 16*a*, a display mode in which communication addresses are rearranged and displayed as in the case of the first embodiment, and a display mode in which communication addresses are rearranged and displayed as in the case of the second embodiment, and a display mode of mobile phone 10 may be switched by manipulation of operation unit 13 by a user. This modification may be applied to mobile phone 30 according to the third or fourth embodiment.

(4) Mobile phone 10 (a computer) performs a processing according to the present invention such as the address book browsing processing (see FIG. 4) or the indication sequence determining processing (see FIG. 11) by executing application software (a program) for managing an address book, installed in nonvolatile memory 16. The program may be provided to mobile phone 10 by communication. Alternatively, the program may be stored in a recording medium such as a magnetic disk, a flexible disk, or an optical recording medium for distribution.

(5) In the above embodiments, a case is described in which the present invention is applied to a mobile phone. However, a communication device to which the present invention can be applied is not limited to a mobile phone. For example, the present invention may be applied to a PHS terminal covered by a simple mobile telephone network, or a wireless communication terminal covered by a public wireless LAN. Alternatively, the present invention may be applied to a personal computer. It is to be noted that, as is clear from the existence of an embodiment in which an external display is connected to a main body of a computer and used, a display means may not be a component of a communication device. It is also to be noted that ranked communication addresses (or user names) may, instead of being displayed on a display, be notified to a user as a speech message, using a speaker and a speech processing unit provided in call processing unit 15. In this case, communication addresses are notified as a speech message in accordance with a notification order.

What is claimed:

1. A communication device comprising:
   a storage means for storing plural communication addresses for one user, one of the plural communication addresses being a communication address of a mobile device owned by the user, and one or more of the plural communication addresses other than the communication address of the mobile device, being associated with first location information at which the user communicates using the corresponding communication address;
   a mobile device location obtaining means for obtaining second location information indicating a location of the mobile device;
   a deciding means for deciding a notification sequence of the plural communication addresses stored in the storage means so that the notification sequence begins with, from the first location information stored in association with the communication addresses other than the communication address of the mobile device, first location information corresponding with the second location information obtained by the mobile device location obtaining means, or first location information indicating a location within a predetermined range from a location indicated by the second location information;
   a notification control means for notifying the plural communication addresses in accordance with the notification sequence decided by the deciding means
   a time keeping means for keeping time;
   a sequence correction means for correcting the notification sequence decided by the deciding means, on the basis of the time, wherein the notification control means notifies the plural communication addresses in accordance with the notification sequence corrected by the correction means;
   a determining means for determining, on the basis of the location information obtained by the mobile device location obtaining means, whether a location indicated by the location information is in a foreign country;
   a time difference correction means for, if it is determined by the determining means that the location is in a foreign country, obtaining a time difference from the location, and correcting the time kept by the time keeping means by an amount of the time difference, wherein the sequence correction means corrects the notification sequence on the basis of the time corrected by the time difference correction means;
   wherein the second location information obtained by the mobile device location obtaining means is switch ID;
   when the mobile device location obtaining means cannot obtain the second location information, the deciding means decides a notification sequence of the plural communication addresses stored in the storage means so that the communication address of the mobile device is set at a bottom of the notification sequence; and
   the communication device further comprises another determining means for determining whether an hour kept by the time keeping means is a predetermined hour, wherein the sequence correction means, in response to an affirmative determination made by the other determining means, corrects the notification sequence decided by the deciding means so that a mail address is prioritized over a telephone number.

2. The communication device according to claim 1, wherein the deciding means, if there is neither first location information corresponding with the second location information obtained by the mobile device location obtaining means, nor first location indicating a location within a predetermined range from a location indicated by the second location information, from the first location information stored in association with the communication addresses other than the communication address of the mobile device, decides a notification sequence beginning with the communication address of the mobile device.

3. The communication device according to claim 1, further comprising:
   an own device location obtaining means for obtaining location information of the communication device;
   a time difference correction means for obtaining, on the basis of the location information obtained by the mobile device location obtaining means and the location information obtained by the own device location obtaining means, a time difference between a time at a location of the mobile device and a time at a location of the communication device, and correcting the time kept by the time keeping means by an amount of the time difference; and
   a sequence correction means for correcting the notification sequence decided by the deciding means, on the basis of the time corrected by the time difference correction means.

4. The communication device according to claim 1, further comprising:
   a selection means for selecting one of the plural communication addresses notified by the notification control means; and
   a communication means for communicating using the communication address selected by the selection means.

5. The communication device according to claim 1, wherein the mobile device location obtaining means comprises:
   an accumulating means for obtaining location information of the mobile device at predetermined intervals, and accumulating the location information in a memory in association with time information indicating a time at which the location information was obtained; and
   a retrieving means for retrieving location information whose corresponding time information indicates a most recent time, from among the location information accumulated in the memory.

6. The communication device according to claim 1, wherein the mobile device location obtaining means comprises:
   an accumulating means for obtaining location information of the mobile device at predetermined intervals, and accumulating the location information in a memory in association with time information indicating a time at which the location information was obtained; and
   an estimation means for estimating a current location of the mobile device, using a history of location information accumulated in the memory.

7. A communication system comprising a communication device and a management device for managing an address book for the communication device, wherein:
   the management device comprises:
   the address book for the communication device for registering plural communication addresses for one user, one of the plural communication addresses being a communication address of a mobile device owned by the user, and one or more of the plural communication addresses other than the communication address of the mobile device, being associated with first location information at which the user communicates using the corresponding communication address;

a mobile device location obtaining means for obtaining second location information indicating a location of the mobile device;

a deciding means for deciding a notification sequence of the plural communication addresses registered in the storage means so that the notification sequence begins with, from the first location information registered in association with the communication addresses other than the communication address of the mobile device, first location information corresponding with the second location information obtained by the mobile device location obtaining means, or first location indicating a location within a predetermined range from a location indicated by the second location information; and a sending means for sending the address book and the notification sequence decided by the deciding means, to the communication device, and the communication device comprises:

a receiving means for receiving the address book and the notification sequence;

a notification control means for notifying the plural communication addresses registered in the address book received by the receiving means, in accordance with the notification sequence received by the receiving means;

a time keeping means for keeping time;

a sequence correction means for correcting the notification sequence decided by the deciding means, on the basis of the time, wherein the notification control means notifies the plural communication addresses in accordance with the notification sequence corrected by the correction means;

a determining means for determining, on the basis of the location information obtained by the mobile device location obtaining means, whether a location indicated by the location information is in a foreign country;

a time difference correction means for, if it is determined by the determining means that the location is in a foreign country, obtaining a time difference from the location, and correcting the time kept by the time keeping means by an amount of the time difference, wherein the sequence correction means corrects the notification sequence on the basis of the time corrected by the time difference correction means;

wherein the second location information obtained by the mobile device location obtaining means is switch ID;

when the mobile device location obtaining means cannot obtain the second location information, the deciding means decides a notification sequence of the plural communication addresses stored in the storage means so that the communication address of the mobile device is set at a bottom of the notification sequence; and the communication device further comprises another determining means for determining whether an hour kept by the time keeping means is a predetermined hour, wherein the sequence correction means, in response to an affirmative determination made by the other determining means, corrects the notification sequence decided by the deciding means so that a mail address is prioritized over a telephone number.

8. A computer program comprising instructions on a non-transitory computer readable medium, the computer program for causing a computer to function as:

a storage means for storing plural communication addresses for one user, one of the plural communication addresses being a communication address of a mobile device owned by the user, and one or more of the plural communication addresses other than the communication address of the mobile device, being associated with first location information at which the user communicates using the corresponding communication address;

a mobile device location obtaining means for obtaining second location information indicating a location of the mobile device;

a deciding means for deciding a notification sequence of the plural communication addresses stored in the storage means so that the notification sequence begins with, from the first location information stored in association with the communication addresses other than the communication address of the mobile device, first location information corresponding with the second location information obtained by the mobile device location obtaining means, or first location indicating a location within a predetermined range from a location indicated by the second location information;

a notification control means for notifying the plural communication addresses in accordance with the notification sequence decided by the deciding means;

a time keeping means for keeping time;

a sequence correction means for correcting the notification sequence decided by the deciding means, on the basis of the time, wherein the notification control means notifies the plural communication addresses in accordance with the notification sequence corrected by the correction means;

a determining means for determining, on the basis of the location information obtained by the mobile device location obtaining means, whether a location indicated by the location information is in a foreign country;

a time difference correction means for, if it is determined by the determining means that the location is in a foreign country, obtaining a time difference from the location, and correcting the time kept by the time keeping means by an amount of the time difference, wherein the sequence correction means corrects the notification sequence on the basis of the time corrected by the time difference correction means;

wherein the second location information obtained by the mobile device location obtaining means is switch ID;

when the mobile device location obtaining means cannot obtain the second location information, the deciding means decides a notification sequence of the plural communication addresses stored in the storage means so that the communication address of the mobile device is set at a bottom of the notification sequence; and comprising another determining means for determining whether an hour kept by the time keeping means is a predetermined hour, wherein the sequence correction means, in response to an affirmative determination made by the other determining means, corrects the notification sequence decided by the deciding means so that a mail address is prioritized over a telephone number.

* * * * *